June 16, 1936.  E. C. LONG  2,044,087
PISTON FOR INTERNAL COMBUSTION MOTORS
Filed July 29, 1933
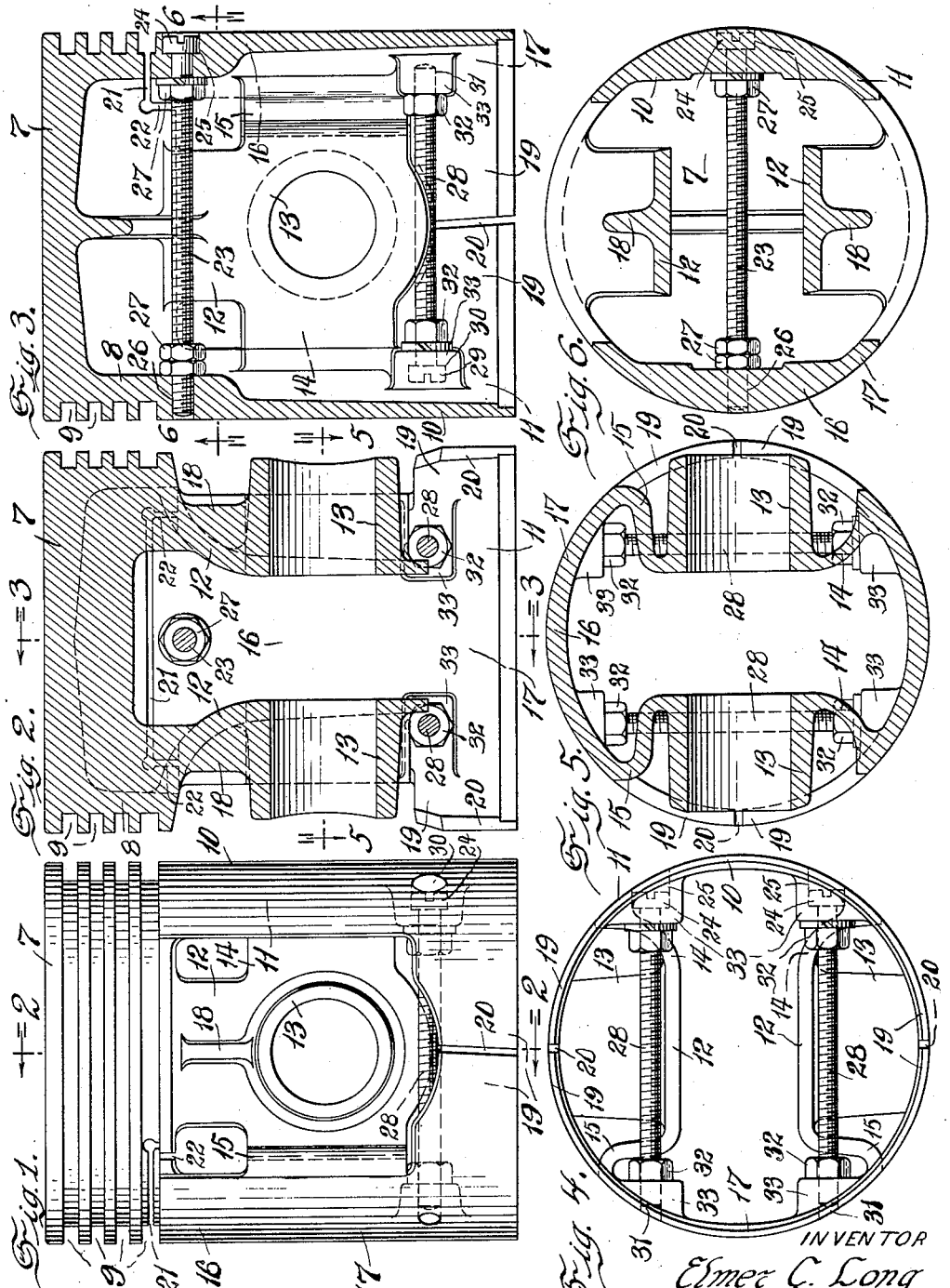
INVENTOR
Elmer C. Long
By Herbert J. Fletcher
ATTORNEY.

Patented June 16, 1936

2,044,087

UNITED STATES PATENT OFFICE 2,044,087

PISTON FOR INTERNAL COMBUSTION MOTORS

Elmer C. Long, Grosse Pointe Park, Mich.

Application July 29, 1933, Serial No. 682,778

3 Claims. (Cl. 309—12)

This application relates to pistons for internal combustion motors and particularly to pistons having one thrust side of the skirt disconnected from the side wall of the head and having resiliently yieldable connection with the pin bosses.

The application also relates to the provision of means connecting the thrust sides of the skirt for preventing normal expansion of the skirt, across the thrust sides.

The invention of the application also provides a skirt of a structure with cooperable means therein for permitting expanding of the skirt for taking up the wear on the skirt.

Other and further objects will appear in the specification and be specifically pointed out in the appended claims, reference being had to the accompanying drawing, exemplifying the invention, and in which:—

Figure 1 is a pin boss side elevation of a piston constructed in accordance with the invention.

Figure 2 is a vertical section taken approximately on the line 2—2 of Fig. 1.

Figure 3 is a vertical section taken approximately on the line 3—3 of Fig. 2.

Figure 4 is an open end elevation of Fig. 1.

Figure 5 is a horizontal section taken approximately on the line 5—5 of Fig. 2.

Figure 6 is an inverted horizontal section taken approximately on the line 6—6 of Fig. 3.

Referring to the several figures, the piston shown comprises a head 7 having a side wall 8, on the outer periphery of which is formed packing ring recesses 9; and formed integral with and depended from the side wall 8 is the power thrust side 10 of the piston skirt 11.

Depending from opposing parts of the side wall 8 is an inwardly and downwardly curved wall 12 each carrying an alining pin boss 13, each wall 12 on one side of the pin bosses terminating into a web 14, said webs being curved outwardly from one another and connecting the skirt thrust side 10. The walls 12 on the other side of the pin bosses terminate into reversely curved webs 15, the extending end of each of said webs merging into the sides of a tongue portion 16 of the compression thrust side 17 of the skirt 11.

The walls 12 engage the inner ends of the pin bosses 13 and a reinforcing rib 18 joins the top of each pin boss with the outer periphery of each wall 12, and the skirt 11 is cut away on the pin boss sides as shown in Figs. 1, 2 and 5, the skirt however, beneath the pin bosses adapted to engage the cylinder wall by the circumferentially extending portions 19 which extend from each thrust side 10 and 17, said portions 19 being separated by the longitudinal slots 20.

The tongue portion 16 on the compression thrust side 17 is separated from the side wall 8 of the head by the transverse slot 21 which is formed in the lowermost packing ring recess 9, said slot at its ends joining a short longitudinal slot 22, said slots entirely separating the tongue portion so that said tongue portion will be resiliently and yieldably held by the reversely curved webs 15.

Connecting the upper end of the tongue portion 16 with the power thrust side 10 is a threaded steel bolt 23, the head 24 of said bolt being mounted in a counter-sunk seat 25 formed in the outer periphery of the tongue portion and the other end of said bolt being threadingly engaged in the threaded opening 26 which is formed in the upper end of the power thrust side 10. The bolt 23 is held in adjusted position by the lock nuts 27.

For connecting the lower portions of the thrust sides 10 and 17, a pair of threaded steel tie bolts 28 are provided, each of said bolts being disposed beneath a respective pin boss and are secured in position by the heads 29 thereof being engaged in respective counter-sunk seats 30 which are formed on the power thrust side 10, the opposite ends of said bolts being secured in threaded apertures 31 which are formed in the compression thrust side 17 of the skirt, said bolts 28 being held in adjusted position by the lock nuts 32 which abut respective lugs 33 which are extended from the inner peripheries of the thrust sides 10 and 17.

The bolts 23 and 28 of this piston are adjusted therein after the piston has been machined or finished, the adjusted positions of the bolts being set to hold a true diameter of the skirt corresponding with the cylinder in which the piston is to be mounted, the adjusting if any, taking place on the resiliently flexible thrust side 17 by reason of its flexible connection with the pin bosses through the spring-like connections 15, as the opposite thrust side 10 of the skirt is rigid or solid with the head.

It will be noted from Fig. 4 that the skirt or portions 19 on the pin boss sides are circumferentially tapered, the portions 19 being thinner at their extending ends, and in the operation of this piston, which may be made of an aluminum alloy, as the piston becomes heated the tie bolts 23 and 28, having a less co-efficient of expansion than the material of the piston, will prevent outward movement or normal expansion of the thrust sides 10 and 17 from one another and the outward expanding movement if any, of the portions 19 of the skirt on the pin boss sides will readily be forced in by cylinder wall pressure on account of the thinning circumferential taper of said portions 19.

When the piston skirt becomes worn, particularly on the thrust sides 10 and 17, the approximate original diameter can be given to the skirt on the thrust sides by manipulating the bolts 23 and 28 to positions of adjustment wherein the thrust side 17 will be expanded or forced outwardly, the yield therefor being provided by the spring-like connections 15.

It is obvious that various changes may be made in the details of construction without departing from the spirit of this invention, and it is therefore to be understood that this invention is not to be limited to the specific construction shown and described.

What I claim is:—

1. A piston comprising a head having a side wall and a pair of thrust sides, one of said thrust sides depending from the side wall of the head and the other thrust side being separated from the side wall of the head, and an adjustable strut turnably fixed at its ends to said thrust sides for adjusting a portion of the separated thrust side either inwardly or outwardly.

2. A piston comprising a head, boss carrying walls depending from the head, a skirt having one of its thrust sides separated from the head, reversely curved webs connecting said walls to said separated thrust side, an outwardly curbed web connecting each wall to the other thrust side, and an adjustable strut connected at its ends to said thrust sides, for adjusting one of the thrust sides either inwardly or outwardly.

3. A piston comprising a head, boss carrying walls depending from the head, a skirt having one of its thrust sides separated from the head, reversely curved webs connecting said walls to said separated thrust side, an outwardly curved web connecting each wall to the other thrust side, and adjustable struts above and below the pin bosses connected at their ends to said thrust sides, for adjusting one of the thrust sides either inwardly or outwardly.

ELMER C. LONG.